United States Patent [19]

Dang et al.

[11] 4,448,663
[45] May 15, 1984

[54] DOUBLE L-SHAPED ELECTRODE FOR BRINE ELECTROLYSIS CELL

[75] Inventors: Hiep D. Dang, Lake Jackson; Richard N. Beaver, Angleton; Frank W. Spillers; Mark J. Hazelrigg, Jr., both of Lake Jackson, all of Tex.

[73] Assignee: The Dow Chemical Company, Midland, Mich.

[21] Appl. No.: 395,404

[22] Filed: Jul. 6, 1982

[51] Int. Cl.³ .......................... C25B 11/03; C25C 7/02
[52] U.S. Cl. .................................. 204/270; 204/283; 204/284; 204/288
[58] Field of Search ............... 204/284, 266, 288, 289, 204/258, 278, 256, 270, 283

[56] References Cited

U.S. PATENT DOCUMENTS

| | | |
|---|---|---|
| 1,303,519 | 5/1919 | Stuart . |
| 3,591,483 | 7/1971 | Loftfield et al. ..................... 204/252 |
| 3,674,676 | 7/1972 | Fogelman ............................ 204/286 |
| 3,677,927 | 7/1972 | Raetzsch et al. ..................... 204/258 |
| 3,719,578 | 3/1973 | Berthoux et al. .................... 204/252 |
| 3,748,250 | 7/1973 | Schmidt et al. ..................... 204/266 |
| 3,755,108 | 8/1973 | Raetzsch ............................. 204/98 |
| 3,759,813 | 9/1973 | Raetzsch et al. ..................... 204/256 |
| 3,849,280 | 11/1974 | Raetzsch et al. ..................... 204/256 |
| 3,852,179 | 12/1974 | Raetzsch, Jr. et al. .............. 204/256 |
| 3,856,651 | 12/1974 | Raetzsch et al. ..................... 204/255 |
| 3,876,517 | 4/1975 | Raetzsch, Jr. et al. .............. 204/147 |
| 3,902,985 | 9/1975 | Raetzsch et al. ..................... 204/268 |
| 3,910,827 | 10/1975 | Raetzsch et al. ..................... 204/98 |
| 3,919,059 | 11/1975 | Raetzsch et al. ..................... 204/129 |
| 3,928,150 | 12/1975 | Rahn et al. .......................... 204/98 |
| 3,932,261 | 1/1976 | Kircher et al. ...................... 204/288 |
| 3,941,676 | 3/1976 | Macken ............................... 204/266 |
| 3,945,909 | 3/1976 | Giacopelli .......................... 204/284 |
| 3,963,596 | 6/1976 | Kircher .............................. 204/258 |
| 3,968,021 | 7/1976 | Rahn et al. .......................... 204/256 |
| 3,980,544 | 9/1976 | Adams et al. ....................... 204/286 |
| 3,981,790 | 9/1976 | Olson et al. ........................ 204/286 |
| 4,008,143 | 2/1977 | Kircher et al. ...................... 204/257 |
| 4,016,064 | 4/1977 | Cunningham et al. ............... 204/256 |
| 4,026,785 | 5/1977 | Ford .................................. 204/286 |
| 4,028,213 | 6/1977 | Ford .................................. 204/286 |
| 4,028,214 | 6/1977 | Ford et al. .......................... 204/286 |
| 4,060,475 | 11/1977 | Fournier et al. ..................... 204/270 |
| 4,101,410 | 7/1978 | Kircher et al. ...................... 204/282 |
| 4,110,191 | 8/1978 | Specht et al. ....................... 204/266 |

FOREIGN PATENT DOCUMENTS 1125493 8/1968 United Kingdom .

Primary Examiner—Howard S. Williams
Assistant Examiner—T. Williams
Attorney, Agent, or Firm—M. W. Barrow

[57] ABSTRACT

Vertical chlor-alkali cell metal anode in the shape of a double L having a hollow interior and a footing which can be attached to the anode's base by manipulations external to the anode's interior and whose hollow interior allows generated chlorine gas to rise inside the anode's interior, and whose design reduces the electrode gap thereby reducing the cell's operating voltage.

12 Claims, 17 Drawing Figures

FIG. 16
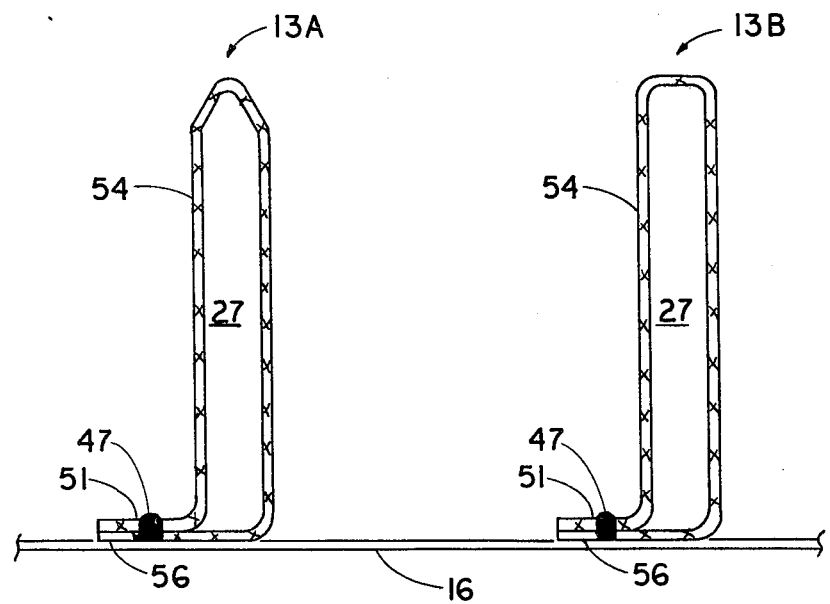
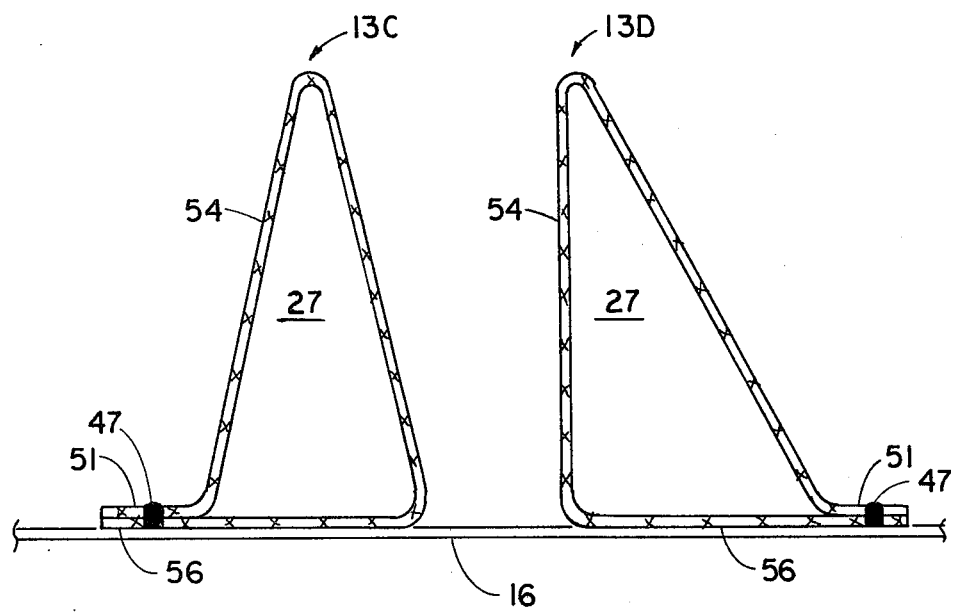
FIG. 17

DOUBLE L-SHAPED ELECTRODE FOR BRINE ELECTROLYSIS CELL

BACKGROUND OF THE INVENTION

1. Field of the Invention

This invention relates to a metal electrode design for electrolysis cells wherein aqueous solutions of alkali metal chlorides are electrolyzed.

2. Prior Art

In the electrolysis of aqueous solutions of alkali-metal halides in electrolytic cells employing interleaved anodes and cathodes, it has been well known for many years that the environment around the anode is very corrosive to most conductive metals. Hence, for many years anodes made of graphite have been used instead of the metals normally thought of as conductive metals; e.g., copper, aluminum and steel. Yet it is known that even graphite anodes deteriorate, albeit slowly, in the hostile anolyte environment.

This deterioration is known to cause a slow reduction in size of the graphite anode. Such a reduction in size, of course, means a widening of the interelectrode gaps between the several interleaved anodes and cathodes. This gap width increase is well known to cause an increase in the cell operating voltage, and, hence, a very appreciable increase in the electrical power cost required for producing the same amount of product.

The electrical power consumption for such cells is determined by multiplying the cell operating voltage by the cell current; i.e., power=voltage x current. It is known that one of the ways to reduce power consumption is to reduce the cell operating voltage; i.e., reduce the voltage in the power equation given above. Inasmuch as very large amounts of current are required in such electrolysis processes, it is economically very desirable to reduce the cell operating voltage even by only a few millivolts. Several improvements in anode, cathode, and cell design have been invented to accomplish this voltage decrease.

In the more recent past, metal anodes made of special non-corrosive metals having catalytic coatings have been discovered as replacements for the relatively wide graphite anodes. Such special metals include valve metals or film forming metals such as titanium, tantalum, niobium, zirconium, etc., with titanium being preferred due primarily to its lower cost. Typically the catalytic coating is either an oxide of ruthenium or spinels of cobalt.

The anodes made from these metals have often been designed to replace the graphite anodes in pre-existing cell designs wherein the cathodes are interleaved between the anodes. Thus graphite blades of thickness of about $\frac{1}{2}$ inch are generally replaced by anodes with each having two parallel sheets of about 1/16 inch thickness serving as metal working faces. These two sheets are spaced far enough apart to be near the adjacent cathodes, the spacing apart of said cathodes generally being set for cells designed for the wider graphite anodes. Examples of cells containing this kind of anode can be found in many references, particularly in references published in the last decade. See U.S. Pat. Nos. 3,674,676; 4,110,191; 4,101,410; 3,963,596; 3,591,483; 3,981,790; 4,008,143; 4,026,785; 4,028,214; 4,028,213; 3,941,676; 3,932,261; 3,980,544; 3,852,179; 3,876,517; 3,902,985; 3,910,827; 3,928,150; 3,968,021; and 4,016,064.

These types of anodes, however, have required parts located or manipulations performed inside the narrow space between the two anode working face sheets in order to physically attach them to the anode base. Assemblying such parts require intricate, time-consuming manipulations which become quite expensive when assemblying many cells containing many anodes.

On the other hand there are references which teach the use of L-shaped metal anodes interleaved between cathode pockets. These anodes are typically a single, solid sheet of metal bent in the shape of an "L", as viewed from above, with the two surfaces of the longer portion of the L-shaped metal sheet serving as the anode's working faces. This longer portion of the L-shape anodes extend between the cathodes of the cell while the shorter portion of the L-shaped anode serves as a flange for electrical and mechanical attachment to the anode's supporting base. For examples of such L-shaped anodes, see U.S. Pat. Nos. 3,755,108; 3,919,059; 3,856,651; 3,677,927; and 3,759,813. British patent 1,125,493 shows an anode of two pieces bolted together to form an L-shaped anode. U.S. Pat. No. 1,303,519 to A. T. Stuart (1919) shows L-shaped anodes for the electrolysis of water to produce hydrogen and oxygen gases.

These single L-shaped anodes all have the advantage of being able to be assembled individually as well as being attached to the anode supporting base without workmen having to devise means and methods to work within tight spaces between dual working faces as is done for those metal anodes having two spaced working faces described above.

It has been found, however, that cells employing these L-shaped anodes operate at a considerably higher voltage than those anodes having two spaced working faces between each pair of adjacent cathodes. It would be advantageous, therefore, to have a single anode which had the low voltage characteristics of the metal anodes employing two spaced working faces and yet have the advantage of easy installation of the single L-shaped anodes. This and other advantages are achieved by the surprisingly simple appearing and simply made anode of the present invention, which herein is also referred to as a "double L anode".

SUMMARY OF THE INVENTION

This invention is a novel anode element and method of making the element. The element is particularly useful in electrolysis cells employing a multiplicity of anode elements. It is quite useful in such cells wherein aqueous solutions of alkali metal chlorides, especially sodium chloride, are electrolyzed. Such cells contain a multiplicity of substantially vertically oriented, substantially parallel, spaced cathode elements extending at least partially across the cell. Within these cells there is a corresponding multiplicity of anode elements which are substantially vertically oriented, substantially parallel and spaced apart. These anode elements extend at least partly across the cell and are interleaved between the cathode elements. Of course, these anode and cathode elements do not directly contact each other in a manner such that there would be an electric short circuit between them. Rather an interelectrode gap is maintained between adjacent anode and cathode elements. The anode elements are mechanically, and often electrically, connected directly to an anode backplate which itself extends across the cell in a direction which is substantially perpendicular to the anode and cathode element extensions. This anode backplate is oriented in a substantially vertical orientation, and together with at least one of the anode elements of this invention forms an anode assembly.

The anode element itself is comprised of a single piece of a bent metal sheet. This metal sheet has a middle section and two end sections with all three sections being substantially vertically oriented within the cell when attached to the anode backplate during normal operation. At least the middle section of this metal sheet is sufficiently foraminous to allow easy passage of gas bubbles and anolyte liquid through this part of the metal sheet.

The single metal sheet is bent outwardly in and about its middle section away from the anode back plate so as to be capable of being interleaved between two opposing adjacent cathode elements. This middle section is also bent outwardly in such a fashion so as to define an anolyte circulation chamber between spaced apart parts of this section.

The two end sections of this single metal sheet are bent from the middle section in a fashion so that they are substantially parallel to one another and the anode backplate, and bent so that they both extend from the middle section in the same direction along the anode backplate. These two end sections are long enough and bent from the middle section in a manner so as to extend far enough to partially overlap one another and be in surface-to-surface contact with each other for at least some part of their length at a location which is external to the anolyte circulation chamber. At this external location the anode element is thereby capable of being easily attached to the anode backplate by manipulations made external to the anolyte circulation chamber.

Thus, this single piece anode has the combined advantage of the ease of assembly afforded by the prior art's "single L anode" while at same time being able to have the smaller interelectrode gap and consequent smaller cell voltage afforded by those anode elements of the prior art which form an anolyte circulation chamber by using two spaced working faces. The anode elements of the present invention have the further advantage of being more uniformily rigidly positionable between cathode elements. Thus the distance between anode working face and cathode working face may be made smaller, thereby contributing to increased power efficiency.

The method of this invention comprises making the above described anode element. It comprises making a bend in the metal sheet at or about the centerline of the middle section of the metal sheet in a manner such that the metal sheet has two spaced legs (as viewed edgewise to the metal sheet) extending back from the bend in a U- or V-shape, and such that the legs of the resulting U or V-shaped member are spaced from one another so as to leave an internal space between the legs of each of them. The method further comprises simultaneously bending with one bending action, each of these two legs into two L-shaped surfaces (as viewed edgewise). The longer side of each L-shaped surface serves as an anode working face, and the shorter side serves primarily as flanges for attaching the anode element to the anode backplate to form an anode assembly. This simultaneous bending action is done such that the shorter sides of the L-shaped surfaces extend in the same direction as one another and are sufficiently long so that they overlap one another in surface-to-surface contact at some part of their length to provide a site at which the anode element can be joined together so as to close the single piece of metal into an anode element having an anolyte circulation chamber defined between the spaced working faces of the two L-shaped legs.

BRIEF DESCRIPTION OF THE DRAWINGS

The invention will be better understood by reference to the drawing wherein the same reference numerals are used to signify like parts in the several figures and wherein:

FIGS. 9, 10, 11, 12, 13 and 14 are sequential, schematic side views of preferred steps used in making the double L anode element 13 with:

FIG. 9 being a schematic side view of a punch 37 and die 36 with the die having a flat sheet of foraminous metal 34 resting on top of it awaiting the downward thrust of the punch mounted above the metal sheet;

FIG. 10 being a schematic side view of the punch 37 and die 36 of FIG. 9 with the punch 37 being thrust down against the former flat foraminous sheet 34 forcing it into a U-shaped envelope 35 in the die;

FIG. 11 being a schematic side view of a V-die set showing the V-die 38 with the U-shaped envelope 35 from FIG. 9, resting on it while awaiting the downward thrust of the V-punch 39 of the V-die set;

FIG. 12 being a schematic side view of the V-die set and former U-shaped envelope 35 of FIG. 11 with the V-punch forcing the former U-shaped envelope 35 down into the V-die to form two right angles 22 and 26 in the legs 23 and 25 of the former U-shaped envelope 35 of FIGS. 10 and 11, leaving each leg in an L-shape so as to form the precursor 40 of anode element 13;

FIG. 13 is a schematic side view of the die set of FIG. 12 with the V-punch removed leaving the legs of the U-shaped envelope bent into an L-shape whose corresponding parts are parallel; i.e., surface 23 parallel with surface 25, and surface 21 parallel with surface 28; and FIG. 14 is a side view of the U-shaped envelope of FIG. 13 with its L-shaped bent legs in a spot welding device wherein the shorter legs 21 and 28 of the two L-shaped surfaces are being spot welded to form a structurally very sound anode unit.

FIGS. 16 & 17 are planar views of anode assemblies showing the top view of several other embodiment shapes of the anode element of this invention attached to an anode backplate 16.

STATEMENT OF THE PREFERRED EMBODIMENT OF THE INVENTION

Figure 1:
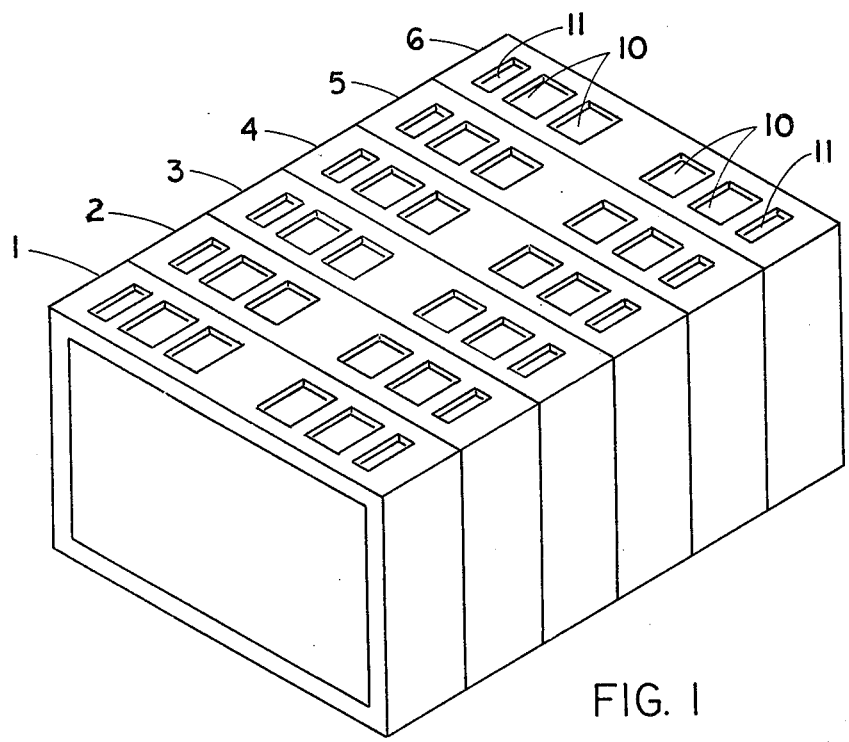
FIG. 1 is an isometric view of a series of six electrolytic cells, 1, 2, 3, 4, 5, and 6, in which the anode assembly of the present invention can be used, said cells being shown in simplified form without their electrical connection means, their external fluid feed means, and their external product removal means.

This preferred embodiment of this invention is a novel anode element and assembly for use in an electrolytic cell wherein aqueous solutions of alkali metal chlorides are electrolyzed. The preferred embodiment includes the method of making such an anode element and assembly. These preferred embodiments can best be seen in FIGS. 2, 3, 4, 5, 6, & 7.

This anode element and assembly is particularly suitable for use in brine electrolytic cells wherein the anode elements and cathode elements are substantially in the shape of rectangular parallelepipeds which are vertically oriented and which are alternately interleaved among one another. These cathodes can be catalytically coated. The anode elements are physically affixed and electrically connected to a vertically oriented backplate while the cathode elements can be affixed to a plate whose orientation has no relation to the invention; i.e., the cathode plate can be oriented in a vertical direction, in a horizontal direction, or in some other direction.

The anode element 13 itself is comprised of a single piece of a bent metal sheet like member. The sheet is electroconductive. Although the sheet is bent into several surfaces, these surfaces are all oriented in the same direction; i.e. if looking at one surface edgewise so that surface appears as a line, then all the other surface edges of the bent metal sheet will also appear as lines; in fact they will appear as one connected line which has several turns in it. When these surfaces are vertically oriented, as they are when used in a cell and attached to an anode backplate 16, then these surfaces of this single metal sheet, as viewed from above or below, will appear as an elongated U, whose two elongated legs are bent into two parallel L's. The shorter legs 21 & 28 of the two L's are away from the bend 24 of the U; they are also bent in the same direction as each other; and they also partially overlap one another. The longer legs 23 & 25 of the two L's serve as working faces for the anode element 13. They are parallel to each other and spaced apart from one another and thereby define an anolyte circulation chamber 27 in the space between them. The short legs 21 & 28 of the two L's overlap at a location external to the anolyte circulation chamber. At least the working faces 23 & 25 of the single metal piece are foraminous.

Alternatively the elongated U-shaped bend can be an V-shaped bend. Then the two L's become skewed L's with the longer legs no longer parallel. The shorter legs are parallel and contact each other in the manner as before.

Also alternatively, the anode element 13 can be defined as being constructed from a single sheet of foraminous metal. It retains its continuity of being a single sheet even though it has several bends in it to allow it to close back on itself. This continuity allows the anode element 13 to be easily made with surprisingly good structural integrity and with trueness to the design structure called for in the design blueprints. This trueness is seldom attained in the actual manufacture of industrial metal anode elements having two spaced working faces attached to a anode backplate.

A second feature provided by the novel design of this anode element is that it is so made such that virtually all the work involved in making it and attaching it to the anode backplate 16 is carried out in ample working space. (See FIG. 7).

The preferred anode element 13 is a single, vertically oriented sheet of foraminous metal. It has two vertical angles 22 & 26 bent in it which are in the form of right angles, substantially right angles, or at least angles of about 70° to about 110°. It is also bent so as to form four surfaces 21, 23, 25, & 28 which are substantially planar and substantially vertical. It also has one curved surface 24 which is also substantially vertical. The tops and bottoms of all five of these surfaces coincide with the top and bottom of the metal sheet. The first of these vertical, planar surfaces 21 is defined by having one of its ends coincide with one end of the single sheet and its other end coincide with the first 22 of the two right angle bends in the sheet. This first vertical planar surface 21 is further defined as being capable of being fixedly attached to an anode backplate 16 in a parallel manner and in surface contact with said anode backplate 16. This first surface 21 serves as a first flange for attaching the anode element 13 to the vertical anode backplate 16. This first planar surface 21 corresponds to one of the end sections (FIGS. 8, 16 and 17) of the metal sheet 34 alluded to above in the section entitled "Summary of the Invention".

The first right angle bend 22 in the single sheet also defines the first end of the second 23 of the planar surfaces. This first right angle 22 is one made in the single sheet 34 in a manner such that the second planar surface of the sheet extends perpendicularly thereto. Thus when in place the anode will extend into the electrolysis cell away from the first planar surface and anode backplate.

This second planar surface 23 is generally longer than the first planar surface 21. Thus, these first two planar surfaces are L-shaped in form when viewed from above (edgewise to) the metal sheet with the shorter leg of the "L" being the first planar surface 21 and the longer leg being the second planar surface 23. This second planar surface 23 serves as the first of two principal electrolytic working faces for the anode element. The second end of this second planar surface 23 coincides with the beginning of the curved planar surface 24 mentioned above.

This curved surface is located at that part of the anode element 13 which is furtherest away from the first planar surface 21; i.e. that surface 21 which is used to attach the anode to the anode backplate 16. Starting from the second end of the second planar surface 23, the first end of this curved surface 24 curves away from the second planar surface 23 in substantially a U-shaped curve so that its second end points back toward the first planar surface 21. This curved surface 24 is on the same side of the second planar surface 23 as is the first planar surface 21. The end of this curved surface coincides with the beginning of the third 25 of the four planar surfaces 21, 23, 25, & 28.

The third planar surface 25 is the second electrolysis working face of the anode element 13. It extends backwardly from the curved surface 24 toward the first planar surface 21; or when the anode is attached to the backplate 16, it also extends backwardly towards the anode backplate 16. It is in a spaced, parallel relationship to the second planar surface 23. An anolyte circulation chamber 27 is defined as the space between these second 23 and third 25 planar surfaces of the single metal sheet 34.

Thus the part of the single sheet of foraminous metal, of which the curved surface 24 and the second 23 and third 25 planar surfaces form a continuous part, appears as an elongated U-shaped formed device as viewed edgewise from above.

The first planar surface 21 extends along the anode backplate 16 sufficiently far so as to not only intercept the third planar surface 25 as it extends perpendicularly back toward it, but also it extends sufficiently far enough past the third planar surface 25 so as to serve as a flanged surface which can be fixedly attached to the anode backplate 16 at sites along the flange which are located past the third planar surface 25 when coming in a direction from the second planar surface 23 along the first planar surface 21. Thus the single metal sheet 34 is allowed to fold back on itself and define an anolyte circulating chamber 27 between the two parallel spaced working faces 23 & 25.

At the location where the third planar surface 25 is intercepted by the first planar surface 21, the third planar surface ends with a second right angle turn 26 made in the same direction as the first right angle turn 22 in the single continuous sheet. This second right angle 26 turn also forms the beginning of the fourth 28 of the four planar surfaces of the single sheet. This right angle turn 26 is directed such that the fourth planar surface 28 extends perpendicularly away from both the second 23 and third 25 planar surfaces in the same direction as the first planar surface 21 in a manner so that this fourth planar surface 28 is parallel to, is in intimate surface-to-surface contact with, and may be fixedly attached to the first planar surface 21.

This fourth planar surface 28 thus serves as a second flange by which the second 23 and third 25 planar surfaces and the curved surface 24 of the anode element 13 may be attached to an anode baseplate or backplate 16 along with the first flange 21. The fourth planar surface 28 and third planar surface 25 thus form a second L-shaped configuration as viewed from above. The shorter leg of the "L" is usually the fourth surface 28 or flange, with the third surface 25 being the longer leg. Thus, the anode element 13, when viewed edgewise from above has the shape of a double L joined by a curved section with the shorter legs of each L, that is the anode flanges, partially overlapping. Hence, the name "double L" anode.

Figure 8:
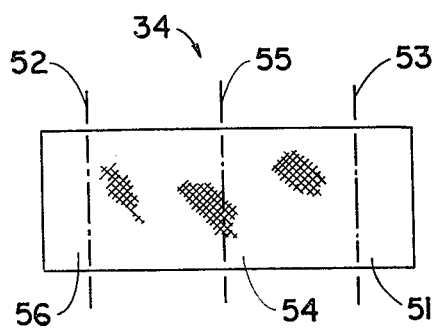
FIG. 8 is an elevation of a single sheet of foraminous metal used in making the anode element of this invention showing its two end sections 56 and 51 as set off by imaginary lines 52 and 53 from the sheets middle section 54 which has a vertical centerline 55.

As can be appreciated from the section above entitled "Summary of the Invention", the illustrations shown in FIGS. 8, 16, & 17, and the further discussion below, the first 21 and fourth 28 planar surfaces of the preferred embodiments correspond to the two end sections 56, 51, respectively, of the single metal piece discussed in the summary, and the second 23 and third 25 planar surfaces of the preferred embodiment combined with its curved surface 24 correspond to the middle section 54 of the single metal piece 34.

The best manner contemplated for making the anode element described above is to make the U-shaped bend before making the L-shaped bends. If the L-shaped bends are made first, then making the U-shaped bend so that the flanges will be in intimate contact with each other without causing one of the working faces to bow either closer to or away from the other working face turns out to be much more difficult.

Figure 10:
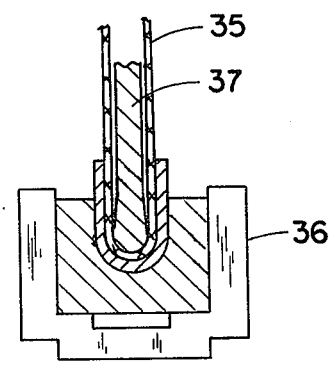
Figure 11:
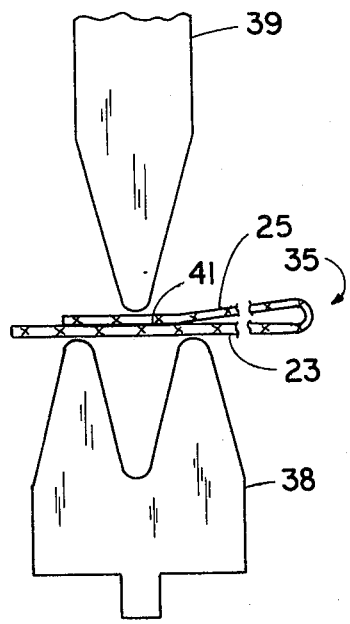

This method comprises:

A. bending a single, substantially rectangular-shaped, foraminous metal sheet 34 (FIGS. 9 & 10) into two flat sections joined at one end by a curved section so as to appear as an elongated U-shaped form 35 as viewed from one edge of the sheet, with said curved section being near, but offset, from that centerline 55 of the metal sheet 34 which is parallel to the two ends of the sheet (as opposed to the horizontal centerline of the sheet which is parallel to the two edges of the sheet) so that one 23 of the two 23 & 25 flat planar sections of the sheet formed by its bending is longer than the other as measured from the U-shaped bend (FIG. 11);

B. next simultaneously bending both planar sections 23, 25 of the sheet near their ends with the same bending action so that they form right angles 22, 26 near the ends of the planar section, each of said planar sections thus being formed into two planar surfaces in an L-shape form as viewed from above, with one such surface 23, 25 being capable of serving as an anode electrolysis working face and the other such surface 21, 28 being capable of serving as a backplate 16 attachment flange, with each of the working faces 23, 27 of the two planar sections being parallel but spaced from one another to define an anolyte circulation chamber 27 while each flange 21, 28 of the two planar sections are parallel to but in surface-to-surface contact with one another;

said right angles bends 22, 26 both being in the same direction as one another so that the two flanges extend in the same direction and extend far enough from the ends of the two working faces so that the two flanges overlap for a sufficient length external to and away from the anolyte circulation chamber 27 formed between the two working faces to allow the anode to be capable of being intimantly attached by both electrical and physical means to an anode backplate at locations which are external to the two defining planar surfaces 23, 25 of the anolyte circulation chamber 27 at sites along the flanges 21, 28 by manipulations carried on external to said chamber 27.

This method preferably further comprises:

welding the two overlapping flanges 21, 28 together at sites 30 on their surfaces which are external to said chamber 27 in a fashion so that the two working faces 23, 25 are parallel to, but spaced from, one another while the flanges 21, 28 are parallel to but contacting one another, the flange and working face of each section of the single sheet having an L-shape form as viewed from the edge of the single sheet, the longer side of said L-shape being the working face 23 or 25 and the shorter side 21 or 28, respectively, being the flange, both L-shaped sections of said single sheet 34 combining with the U-shaped curved section to form a double L-shaped anode as viewed from the sheet's edges with the longer sides 23, 25 of said L-shaped sections being parallel to and spaced apart from one another while the shorter sides 21, 28 of said L-shaped sections overlap, but overlapping only to a limited extent since the short leg 21 of one L-shape side has to cross the space between the two spaced parallel longer legs 23, 25 of L-shaped side in order to reach the shorter leg 28 of the other L-shaped side before it can overlap it and then both 21, 28 extending sufficiently further from both of the longer sides 23, 25 of the two L-shaped sides to form an anode backplate double flange attachment which is external to the anolyte compartment 27.

DETAILED DESCRIPTION OF THE PREFERRED EMBODIMENT OF THE INVENTION

Referring to FIG. 1, a series of six electrolytic cells 1, 2, 3, 4, 5 and 6 can be observed. These cells are representative of the types of electrolytic cells in which sodium chloride brine is electrolyzed to form chlorine, caustic, and hydrogen and in which the anode element and assembly of the present invention can be used. Each of these cells 1, 2, 3, 4, 5 and 6 have a sodium chloride brine inlet 11 through which the brine to be electrolyzed can enter. Each cell has a caustic outlet (not shown) through which caustic generated in the cells can exit. Each cell has chlorine gas outlets 10 and hydrogen gas outlets (not shown). The chlorine gas and hydrogen gas collectors are not shown; nor are the electrical connections and feed systems shown as they would tend to obscure the invention.

Figure 2:
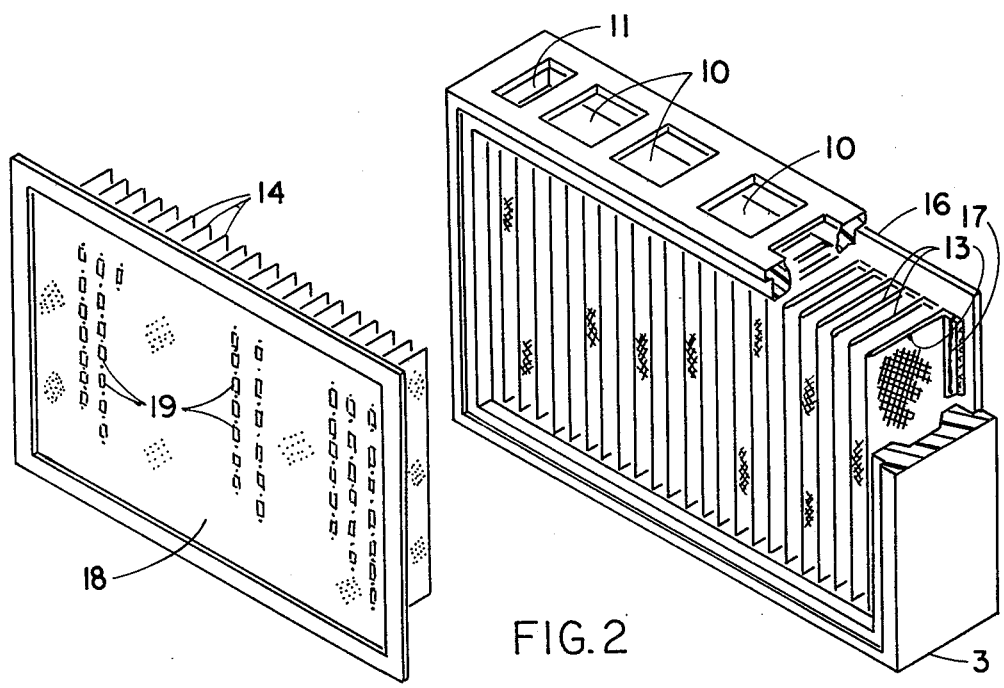
FIG. 2 is an isometric view, partially broken away and partially exploded, of one of the cells of FIG. 1.
Figure 3:
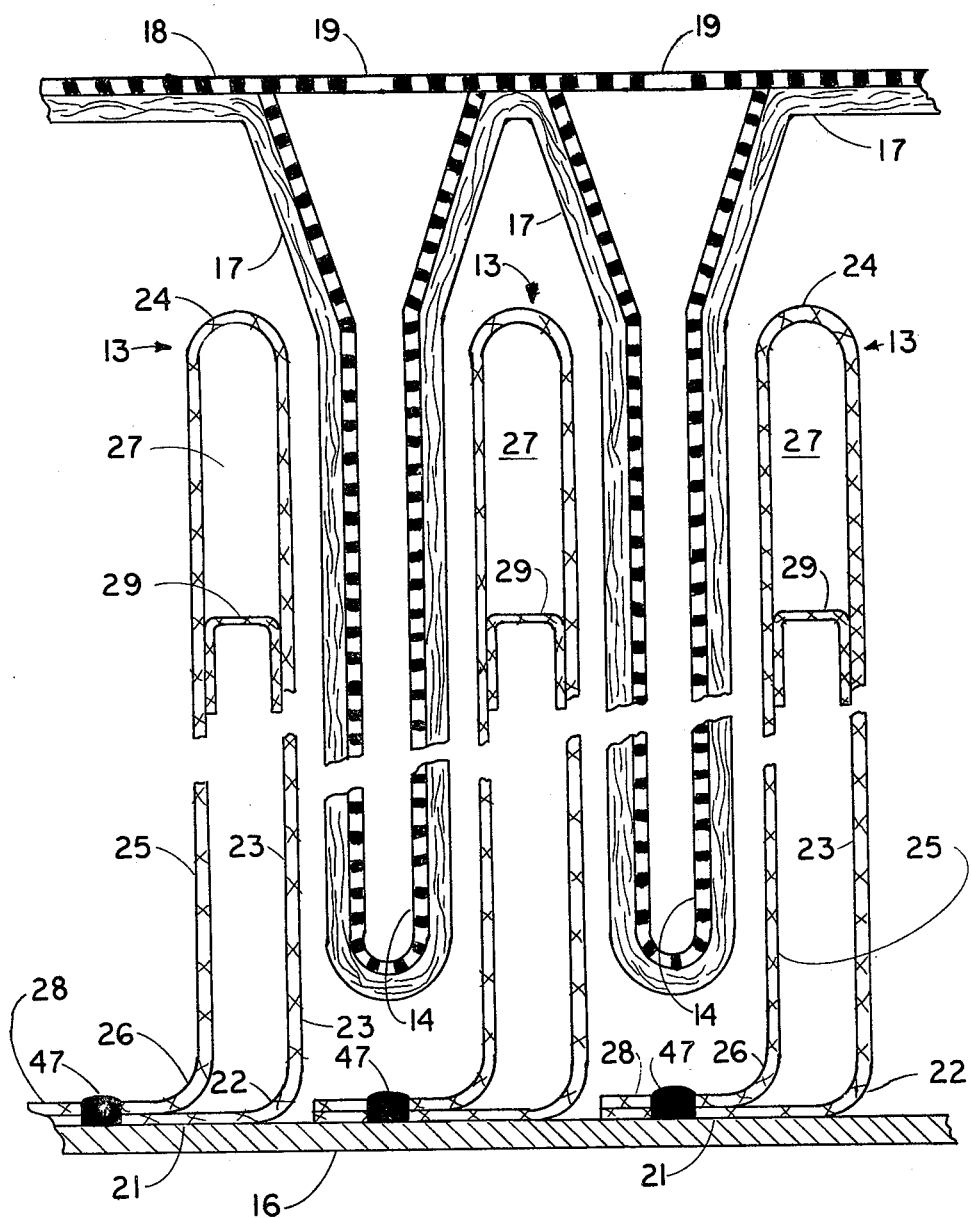
FIG. 3 is a sectional view of a part of one cell of the cell series of FIG. 1 as seen along cutting plane 3—3 in FIG. 1, wherein are shown the relationships between the anode elements 13, the cathode elements 14, the non-porous permselective membranes or porous asbestos diaphragms 17, the vertical anode backplate 16, and the vertical cathode base 18.
Figure 4:
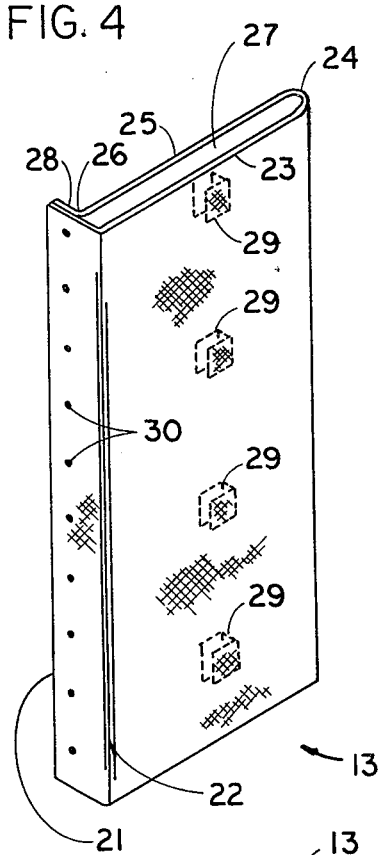
FIG. 4 is an isometric view of the preferred embodiment of the double L anode element 13 of this invention.

The relationships of the internal cell parts can better be seen by reference to FIGS. 2 and 3. Therein can be observed the interleaved relationship existing between the spaced, double L-shaped anode elements 13 and the spaced, foraminous steel cathode pocket elements 14. Cathode pocket elements 14 are shown coated with water permeable, diaphragms 17 (FIG. 3). Examples of such diaphragms are asbestos, porous polymers and other porous non-asbestos separators such as porous TEFLON polymer. Of course, an ion exchange membrane can be used instead of the permeable diaphragm 17 in separating the anode elements 13 from the cathode pockets 14. Such membranes also could be used in addition to such asbestos diaphragms 17; or as in the case of chlorate cells, neither ion-exchange membrane nor porous diaphragms nor separators of any kind are necessary or desired. Examples of these ion-exchange membranes are the perfluorosulfonic acid resin membranes, perfluorocarboxylic acid resin membranes, composite membranes, and chemically modified perfluorosulfonic or perfluorocarboxylic acid resin membranes.

Double L anode elements 13 are attached to anode backplate 16 by welding, or other means, to secure the anode to the backplate in structurally and electrically firm contact. Strip welds 47 (FIGS. 2 and 7), are preferred. Backplate 16 is preferably made of a sheet of metal with a titanium surface (clad or bonded titanium to steel included) so as to be capable of physically supporting and conducting electricity to anode elements 13 while at the same time being resistant to the corrosive environment of the anolyte compartment in such cells.

Foraminous cathode pocket elements 14 are bolted to steel plate cathode backplate 18, the bolts not being shown to simplify comprehension of the drawing. Catholyte openings 19 are provided in cathode backplate 18 in such a fashion to allow the entry and egress of catholyte to and from the hollow interior of foraminous steel cathode pockets 14 as well as to allow egress of hydrogen gas generated at the working faces of these cathode pockets 14. Between cathode backplate 18 and the anode backplate (not shown) of the next adjacent cell (not shown) a chamber (not shown) is provided to allow the catholyte to circulate and the hydrogen gas (if formed) to rise through baffling structure (not shown) and leave the cell. Of course, in depolarized cathode cells, hydrogen gas is not generated, and thus hydrogen outlets are not needed.

It should be also noted that anode elements 13 are advantageously usable in many configurations and types of electrolytic cells other than the cell type shown in the drawing. For example, individual cells not in a series and cells wherein the cathodes are attached to the bottom or top of the cell instead of the side are quite adaptable to use the double L anode.

Passing now to a discussion of the preferred embodiment of the double L anode element 13 itself. (See FIGS. 2–7, especially FIG. 4). The anode element 13 is seen to be made from a single, vertical sheet of foraminous metal such as expanded metal, woven wire, and punched plate. Preferably a single sheet of flattened expanded metal is used. Anode element 13 can be seen to be bent into five vertical surfaces of which there are four vertical planar surfaces 21, 23, 25, 28, and one curved vertical surface 24. Also present in the single sheet are two vertical right angles, 22, and 26. The combination of surfaces 23, 24, and 25 correspond to the bent middle section discussed in the Summary of the Invention section set forth above. Planar surfaces 21 and 28 correspond to the two end sections of the single metal piece set forth in that same section.

The first vertical planar surface 21 is parallel to, in surface-to-surface contact with, and secured to anode backplate 16 preferably by resistance welding to form strip weld 47. As such this surface serves as a flange of anode element 13. The first vertical right angle bend 22 of the single sheet 34 is the end of the first planar surface 21 and the beginning of the second planar surface 23.

The second planar surface 23 extends perpendicularly outwardly from anode backboard 16 for a predetermined distance until it ends at the beginning of vertical curved surface 24 of sheet 34.

Curved surface 24 is a sharp return bend whose end is the beginning of the third planar surface 25.

Figure 9:
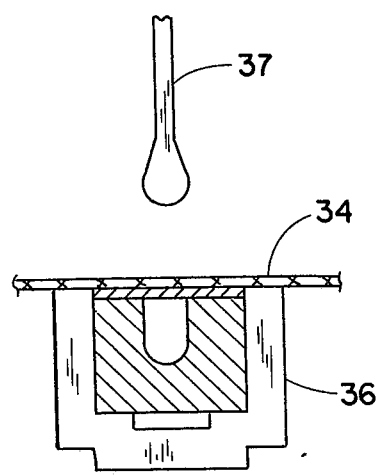

Third planar surface 25 forms the second working face of anode element assembly 13. This third planar surface 25 extends back in the direction of anode backplate 16 in a perpendicular fashion until it contacts the first planar surface 21. Thereat it terminates with the second right angle bend 26 in said single vertical sheet 34. (FIGS. 8 & 9).

The second and third vertical planar surfaces, 23 and 25, are parallel and spaced apart so as to define an anolyte circulation compartment 27 therein between them. Anolyte circulation compartment 27 provides a place inside which anolyte can circulate and much of the generated gas can rise. This is unlike the single L anode cells wherein all anolyte circulation and gas rising must take place in the gap between the anode element and cathode working faces. Hence the double L anode provides a lower electrical resistance than that allowed by single L-shaped anodes. This greater interelectrode gap is required for the single L anodes because closer center to center spacing has two disadvantages. First, cathode elements have to be placed on closer center to center spacing which makes the asbestos diaphragm depositing step extremely difficult. Secondly, the closer center to center spacing of single L anodes decreases the anolyte volume which increases the gas loading into the anolyte liquid for a given current density. The gas loading increases the resistance to current conduction and thus reduces the benefits gained by decreasing the electrode gap.

The "double L" anode decreases the electrode gap but holds the anolyte volume constant and thus does not increase gas loading.

At the second right angle bend 26 where the third planar surface 25 ends, thereat is also the beginning of the fourth vertical surface 28 of bent sheet 34. The fourth planar surface 28 overlaps the top of the first planar surface 21, and the two surfaces are in surface-to-surface contact with one another for the length of planar surface 28. These two planar surfaces 21, 28 extend along anode backboard 16 for a sufficient distance from the second and third planar surfaces 23, 25 to be capable of being easily welded with spot welds 30 to each other at easily accessible sites on that part of their surfaces which are external to the anolyte circulation compartment 27.

As can be seen, planar surfaces 21 and 23 are in an L-shaped form when viewed from above as are planar surfaces 25 and 28. Hence the name "double L anode". This nomenclature will be useful in distinguishing this anode from the prior art single L anode (FIG. 15) in the comparative experiments given below.

Although not necessary to the improved structural integrity of the anode element 13, it has been found that even greater structural integrity is achieved for anode element 13 by locating spacing means between the anode's two planar surfaces 23 and 25 to rigidly maintain these surfaces the same distance apart. In the drawings the spacing means used are the U-shaped titanium metal elements 29 welded between planar surfaces 23 and 25. (See FIGS. 3–6).

The anode element 13 can be made of any bendable, foraminous, electroconductive metal which is suitable for use in the corrosive environment of an anolyte chamber. Examples of suitable metals are titanium, tantalum, zirconium, molybdenum, niobium, tungsten, vanadium, and alloys thereof.

Often these anodes have catalytic coatings on them. For brine electrolysis, examples of such catalytic coating are ruthenium oxide, noble metals and mixtures, alloys, or oxides thereof. Another effective coating is a metal oxide spinel having the formula $M_xN_yCo_{3-(x+y)}O_4$ where $0 \leq x \leq 1$ and M is a metal or a mixture of two or more metals selected from groups IB, IIA, and IIB of the periodic table; $0 \leq y \leq 0.5$ and N is a metal or a mixture of two or more metals selected from Groups IA of the periodic table of the elements; and $0 \leq x+2y \leq 1$. The coating contains therein, optionally, a modifier oxide such as $ZrO_2$.

Interposed between the electroconductive substrate and the active spinel coating, for example is optionally, an interface coating consisting of one or more base metal oxides selected from the oxides of Sn, Sb, Pb, Al, and In, or, alternatively, one or more platinum group metals or their oxides. A base metal oxide interface coating may or may not be suitable as an anode in the absence of the outer, active spinel coating. A platinum group metal- or oxide-containing interface coating is of insufficient thickness to be operable as an anode in the absence of the outer, active coating.

Figure 6:
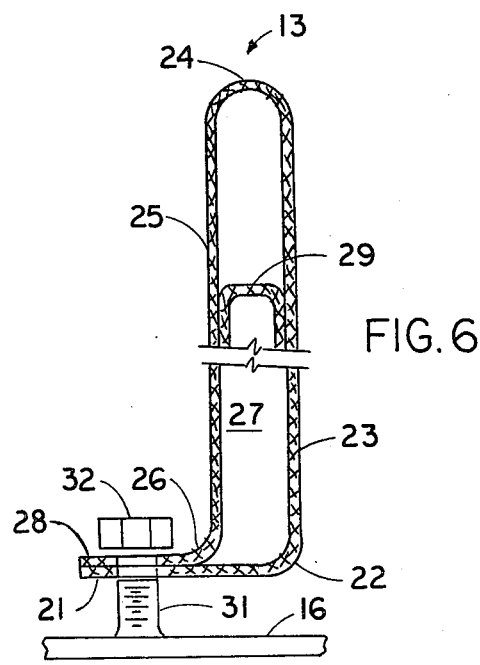
FIG. 6 is an exploded top view of an alternative embodiment of this invention showing the anode element 13 bolted to studs 31 which themselves are welded to the anode backplate 16.

An alternative embodiment of the welded double L anode assembly can be found in FIG. 6. Here the anode element 13 is shown as being electrically and physically attached to anode backplate 16 by titanium studs 31 and titanium nuts 32. Note that studs 31 are welded to anode backplate 16 instead of having bolts pass through bolt holes cut in the backplate 16. Such holes are a potential source of anolyte leaks which are, of course, to be avoided. However, although the use of welds or studs and bolts to physically and electrically attach the double L anode element to the anode backplate 16 are usually preferred, this does not mean that other means of attachment such as bolts through bolt holes are excluded from this invention. This invention encompasses all means of electrically and structurally connecting and attaching the double L anode element to the backplate 16.

Figure 7:
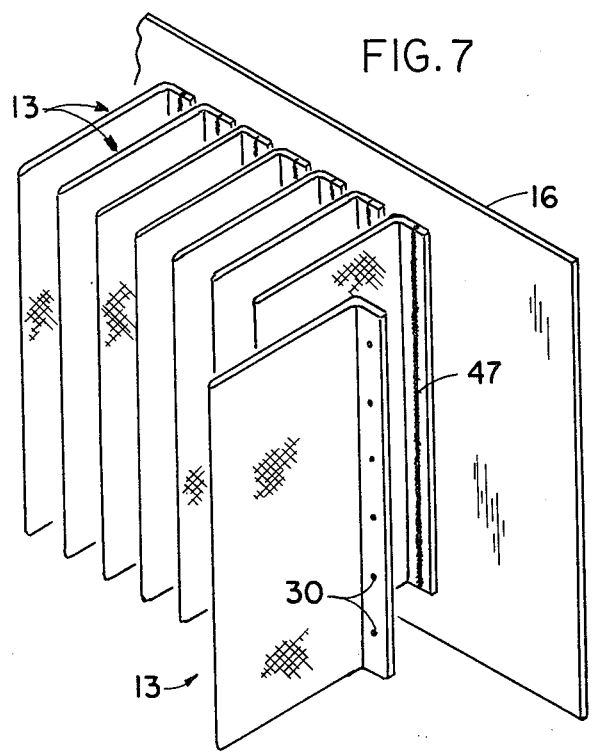
FIG. 7 is an isometric view showing a plurality of double L anode elements 13 attached and one about to be attached to an anode backplate 16.

By referring to FIG. 7, one can readily see one of the advantages of assembly of the double L anode elements 13 to the anode backplate 16. Therein it can be seen that by starting at the far end of anode backplate 16 each anode 13 can be easily welded to anode backboard 16 without having to work in a crowded location between adjacent anodes, elements, or between adjacent anode working faces of the same anode element, as is most often the case when dealing with anode elements which each have two spaced apart working faces.

Figure 15:
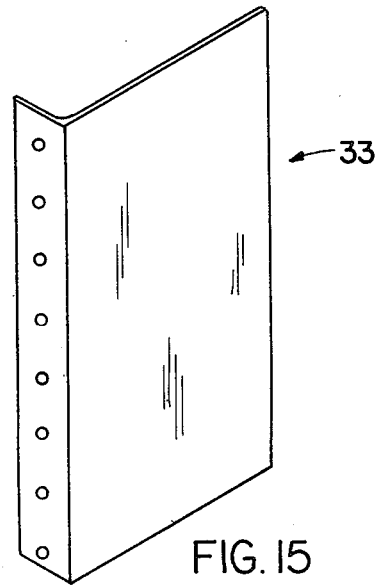
FIG. 15 is an isometric view of a solid-sheet, single L anode 33 which is representative of the L-shaped anodes of the prior art.
Figure 1:
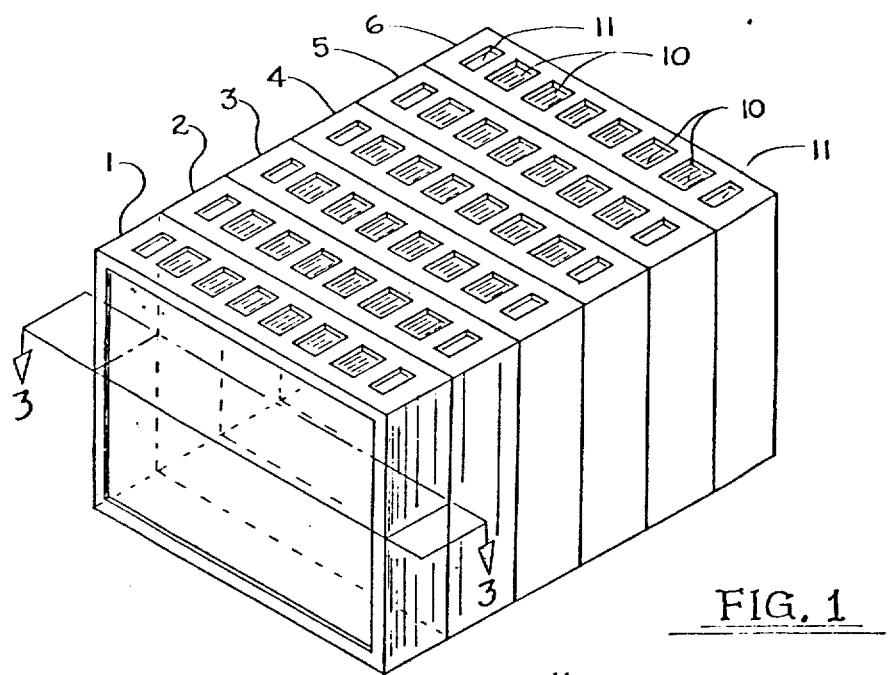
Figure 2:
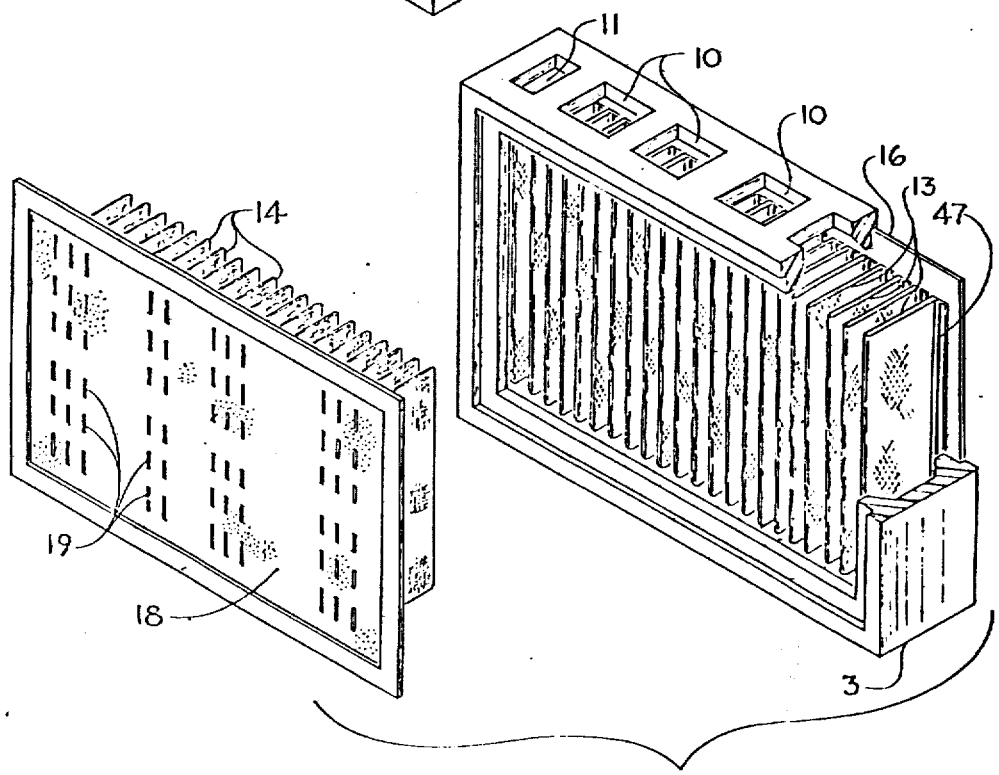

For ease of comparison a drawing of the embodiment of a single L anode element 33 commonly known in the prior art is shown in FIG. 15. It can be seen that although this old anode element 33 has the same L-shape feature that makes it readily assembled to the anode backboard 16 in the same manner as the double L anode element 13 of this invention, it lacks the anolyte circulation compartment 27 of the double L anode element 13. The double L anode element 13 will be shown to operate at much lower cell voltage requirements than the single L anode element 33 in the comparative experiments below.

The preferred method of assembling the double L anode element 13 from a single sheet of foraminous metal is illustrated in FIGS. 9–13. The principal ideas in the method are: (1) to make the U-bend 24 in the metal sheet 34 prior to making the two L-bends 22, 26 instead of vice versa; and (2) to make the two L bends 22, 26 with the same stroke, for otherwise it is much more difficult to get the relative lengths of the second and third vertical planar surfaces 23 and 25 just the right lengths so the first and fourth vertical planar surfaces 21 and 28 will be in surface-to-surface contact with each other without causing either planar surface 23 or 25 to bow in or out. Even carrying out the making of the anode 13 according to the principals set forth immediately above requires a subtle compensation during the double L bending process (FIG. 11) to avoid such bowing. This compensation will be discussed below in the discussion of the bending steps shown in FIGS. 11–13.

In FIGS. 9 and 10 are illustrated the step of making the U-shaped bend 24 in the single sheet 34 and transforming the single sheet into an elongated U-shaped envelope 35. In FIG. 9, a flat sheet of expanded metal 34 is shown resting on the upper surface of die 36 with punch 37 hovering above it. Next, in FIG. 10, the punch 37 is shown to have bent former flat sheet 34 into an elongated U-shaped envelope 35.

Figure 12:
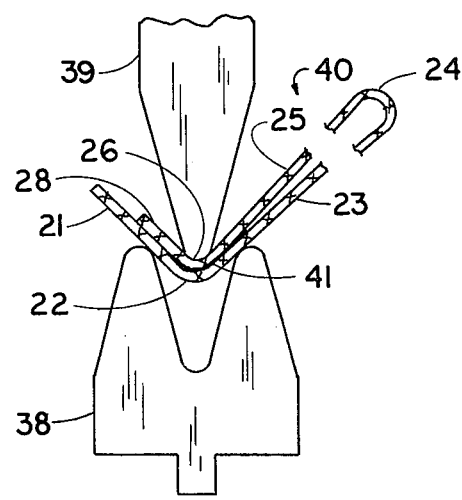

Following this, as shown in FIG. 11, U-shaped envelope 35 is shown resting on the top of V-shaped die 38 just below V-shaped punch 39 at the moment just before punch 39 forces envelope 35 into die 38. FIG. 12 shows where V-shaped punch 39 has descended sufficiently into V-shape die 38 to form the two L-shaped angles 22 and 26, and thus change elongated U-shaped envelope 35 into the immediate precursor 40 of double L anode 13.

Figure 13:
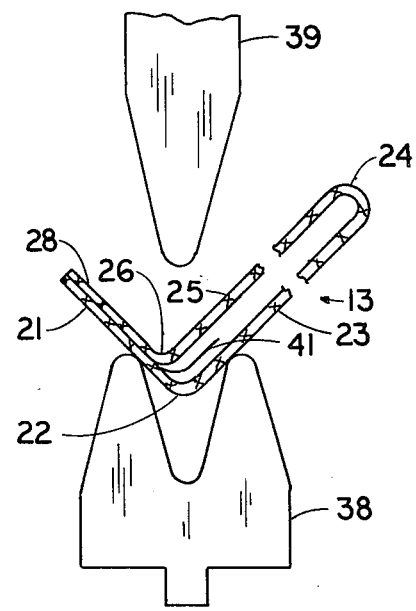

In FIG. 13, punch 39 has been retracted and the two planar surfaces 23 and 25 have been spaced apart until they are parallel thus leaving double L anode element 13 virtually finished.

In FIG. 13 the compensation for preventing bowing of surfaces 23 and 25 while having surface-to-surface contact can best be seen. This compensation is thin metal strip 41. By following the sequence of double L bending steps shown from FIG. 11 through FIG. 13, it can be seen that without the presence of thin metal strip 41, the surface 25 next to punch 39, is going to be somewhat longer in FIG. 12 than is desired for it to be in FIG. 13 if it is to remain straight and not bowed by the constriction between surfaces 21 and 24 when it moved from the position shown in FIG. 12 to that in FIG. 13. This extra length of surface 25 would come from the right triangular configuration of anode precursor element 40 as seen in FIG. 12. Therein surface 25 correlates to the hypotenuse of a right triangle while surface 23 correlates to and has the length of one of the right triangle's sides. Since a hypotenuse is longer than any one of the two sides, and since surface 25 is desired to be somewhat shorter than this hypotenuse, the thin metal 41 allows the surface 25 to be the desired length. Of course, this metal strip 41 is removed after the bending is completed. One other advantage provided by this thin metal strip should not be overlooked, and that is that it allows the bending metal surfaces within die 38 to readily slide by one another during their L-shaped bending process.

Figure 14:
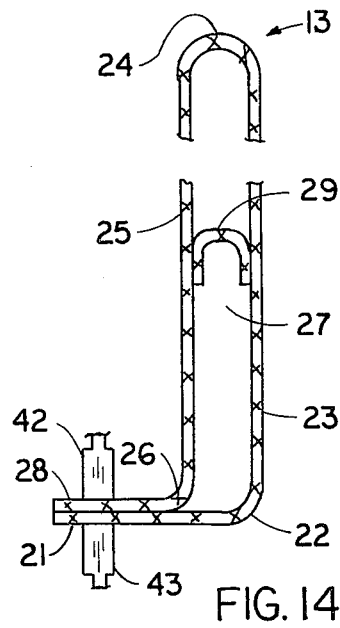

To complete the making of this preferred double L anode element, its planar surfaces 21 and 28 are spot welded together by resistance welding devices 42 and 43 as shown in FIG. 14 to give spot welds 30 discussed above. This fixes the spacing between planar surfaces 23, 25. And, if desired, spacing units 29 are then welded between planar surfaces 23 and 25 to reinforce the rigidity of this spacing.

COMPARATIVE EXPERIMENTS

To illustrate the cell voltage advantages of the double L anode of this invention over the single L anode of the prior art, two comparative sets of experiments were run in two full cell series such as the one cell series shown in FIG. 1 except that many more cells were used in each of the two experimental series of cells than is shown in the FIG. 1. The cells in each experiment were alike and were like those shown in FIG. 2 except for the type of anodes used. Thus each cell in the same series in each experiment had the same cell feed and the same amount of electric current flowing through it as did every other cell in that series.

EXPERIMENT I

Figure 5:
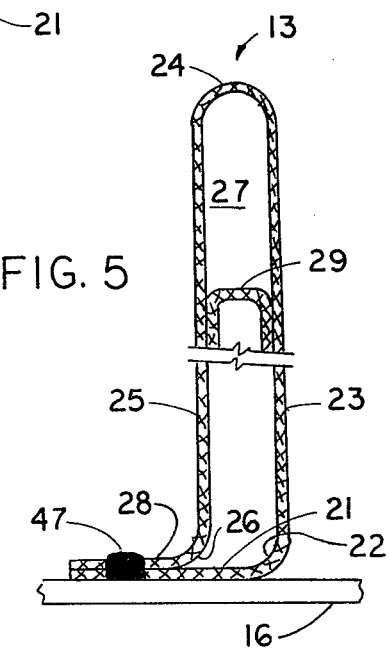
FIG. 5 is a top view of the preferred embodiment of the anode assembly for this invention, the anode element 13 welded to the anode backplate 16.

In this experiment the double L anodes 13 which were used were bolted to the anode backplate as in FIG. 6 instead of being welded as in Experiment II given below (FIG. 5). In the cell series of this experiment there were eighteen (18) cells used which employed bolted double L anodes 13 as shown in FIG. 6. In this same series there were thirty-nine (39) cells employing the bolted single L anodes 33 as shown in FIG. 8. The double L anodes were made of expanded titanium with a ruthenium oxide coating. The thickness of the expanded metal was 0.063 inches. The single L anodes 33 were made of solid sheets of titanium coated with ruthenium oxide and were 0.063 inches thick.

The cells were connected electrically in series on a common current source and thus operated at identical ampere loading.

This series was run virtually continuously for more than five months over which time cell data was intermittently collected after the cells had been in service long enough to stabilize. The voltage data for the cells of each type was averaged each time it was taken, and the mean standard deviation calculated for each average. This can be seen in Table I below. The dates the data were taken are given in Julian Calender type form with the first data date arbitrarily being assigned as date "138".

TABLE I
CELL VOLTAGE COMPARISONS FOR DOUBLE L MESH ANODES (BOLTED) VERSUS .063" SOLID SHEET SINGLE L ANODES

| Julian Date Data Was Taken | Double L* Anodes Cell Voltage Std. Deviation for 18 cells (Volts) | Single L** Anodes Cell Voltage Std. Deviation for 39 cents (Volts) | Average Voltage Advantage of Double L Anode Cells (Millivolts) |
|---|---|---|---|
| 1 | 0.030 | 0.037 | 67 |
| 9 | 0.031 | 0.041 | 51 |
| 19 | 0.039 | 0.073 | 56 |
| 34 | 0.025 | 0.032 | 51 |
| 43 | 0.024 | 0.030 | 51 |
| 48 | 0.025 | 0.028 | 37 |
| 60 | 0.025 | 0 023 | 37 |
| 69 | 0.035 | 0.032 | 62 |
| 85 | 0.038 | 0.029 | 65 |
| 104 | 0.039 | 0.025 | 64 |
| 113 | 0.037 | 0.028 | 72 |
| 119 | 0.035 | 0.030 | 73 |
| 131 | 0.037 | 0.029 | 73 |
| 141 | 0.036 | 0.034 | 75 |

*Bolted to anode backboard
**Bolted to anode backboard

As can be seen above the double L mesh anode of this invention continuously gave much better (lower) cell voltage readings, than the cells employing single L anode elements.

EXPERIMENT II

This experiment was run just like Experiment I with the exception that the double L anode elements 13 were welded to their anode backboards 16 instead of being bolted, and with the further exception that there were different numbers of double L and single L anode cells in this series. In this series there were fourteen (14) cells equipped with double L mesh anode elements 13 while there were forty-three (43) cells equipped with the single L, solid sheet anodes of the prior art. Data for the cells was gathered and averaged as it was in Experiment I. This data is shown in Table I below.

TABLE II
CELL VOLTAGE COMPARISONS FOR DOUBLE L MESH ANODES VERSUS SINGLE L ANODES

| Julian Date Data Was Taken | Double L* Anodes Cell Voltage Std. Deviation for 14 cells (Volts) | Single L** Anodes Cell Voltage Std. Deviation for 43 cells (Volts) | Average Voltage Advantage of Double L Anode cells (Millivolts) |
|---|---|---|---|
| 1 | 0.028 | 0.033 | 100 |
| 7 | 0.028 | 0.038 | 103 |
| 20 | 0.020 | 0.037 | 108 |
| 28 | 0.020 | 0.035 | 104 |
| 35 | 0.020 | 0.040 | 103 |
| 47 | 0.019 | 0.037 | 93 |

TABLE II-continued
CELL VOLTAGE COMPARISONS FOR DOUBLE L MESH ANODES VERSUS SINGLE L ANODES

| Julian Date Data Was Taken | Double L* Anodes Cell Voltage Std. Deviation for 14 cells (Volts) | Single L** Anodes Cell Voltage Std. Deviation for 43 cells (Volts) | Average Voltage Advantage of Double L Anode cells (Millivolts) |
|---|---|---|---|
| 57 | 0.024 | 0.037 | 82 |
| 77 | 0.024 | 0.039 | 85 |
| 83 | 0.029 | 0.040 | 80 |
| 106 | 0.018 | 0.046 | 109 |
| 141 | 0.019 | 0.041 | 81 |
| 153 | 0.027 | 0.045 | 116 |

*Welded to anode backboard
*Bolted to anode backboard

Again the double L anode equipped cells in the cell series clearly outperformed the cells equipped with the single L anodes in that same cell series. In fact in comparing the voltage advantages of the double L anode equipped cells over the single L anode cells of this experiment with the voltage advantages of Experiment I it is seen that not only are the welded double L anode cells far superior to the single L anode cells, but also they are superior to the bolted double anode cells.

ALTERNATIVE EMBODIMENTS OF THE INVENTION

Having described the preferred embodiment of anode element 13, it should be pointed out that there are many other embodiments of it. To illustrate this, reference is made to FIGS. 16 and 17 wherein several embodiments of different shapes are attached to a common anode backplate 16 by welds 47. Some of these are less desireable than others, but they serve the purpose of illustrating the broadness of this invention.

None of these anode element embodiments 13A, 13B, 13C, 13D, have the same combination of surfaces and angles as does the preferred embodiment, but they do all have the common features prescribed in the Summary of the Invention section set forth above. They all have the common feature of being bent from a single piece of a foraminous metal sheet 34: (See FIG. 8 also). They all have a middle section 54 bent outwardly in a manner so as to define an anolyte circulation chamber 27. The two end sections 56, 51 of each of them are seen to bent from the middle section 54 in such a fashion so that they are substantially parallel to one another and to the anode backplate 16. These two end section 56, 51 are both so bent so that they both extend from the middle section 54 in the same direction along anode backplate 16. They are both also long enough to at least partially overlap one another and be in surface-to-surface contact with each other for at least some part of their length at a location which is external to anolyte circulation chamber 27. At this location they are also capable of being attached to backplate 16 by means such as welding or bolting.

Anode element 13A is best described as a V-tipped, U-bend double L anode element. Anode element 13B is best described as a square U-bend, double L anode element. Anode element 13C is best described as a V-shaped, double L anode element. Anode element 13D is best described as a wedge shaped, double L anode element.

Therefore, having fully described and set forth the invention,

We claim:

1. An electrode element comprised of a single piece of metal sheet, said metal sheet being bent in a manner so that the perimeter of the sheet's middle section defines a substantially enclosed electrolyte circulation chamber (27); at least said middle section being foraminous; the end sections of said sheet being bent so as to partially overlap one another in surface-to-surface contact at a location external to the electrolyte circulation chamber (27) so as to form attachment flanges for the electrode; said end sections being bent from said middle section at vertical angles of from about 70° to about 110°; and
    all three sections being oriented in a fashion such that they appear as a continuous, albeit bent, line when the bent single metal sheet is viewed edgewise.

2. In a brine electrolysis cell in which there is a multiplicity of spaced, substantially vertically oriented cathode elements extending at least partly across the cell, said cathode elements being supported in the cell by support means in a spaced apart relationship with respect to one another; and in which cell there is a multiplicity of substantially vertically oriented and spaced apart anode elements, said anode elements extending at least partly across the cell in an interleaved and spaced apart relationship with respect to the spaced cathode elements; and in which cell the anode elements are attached to and physically supported by a substantially flat, substantially vertically oriented anode backplate; said backplate extending across the cell in a manner such that it is substantially perpendicular to the anode elements; the improvement which comprises:
    at least one of the anode elements of the cell being comprised of a single piece of a metal sheet, said single metal piece having two end sections and one middle section with the surfaces of all three of these sections being substantially vertically oriented in the cell, and with at least the middle section being sufficiently foraminous to allow easy passage of gas bubbles and liquid therethrough;
    said single metal piece being bent outwardly in and about its middle section in a direction away from the anode backplate so as to be interleaved between and spaced from two adjacent cathode elements in the cell in such a manner so as to form interelectrode gaps between the anode element and adjacent cathode elements;
    said outwardly bent middle section being bent so that an anolyte circulation chamber is formed between spaced apart portion of it; and
    said two end sections of said bent single piece of metal sheet being parallel to the anode backplate with both of the two end sections extending from the middle section in the same direction along the anode backplate, said end sections extending far enough from the middle section to overlap one another in surface-to-surface contact for at least some part of their length at a site external to the anolyte circulation chamber, said anode element being mechanically connected to said anode backplate at this external site.

3. An anode element comprised of a single piece of a sheet-like metal member which is bent so as to have more than one section but all of whose sections are oriented in the same direction in such a fashion so that when looking at the metal sheet edgewise all of its sections will appear as one continuous line having turns or bends in it, as follows:

said sheet being bent to return upon itself or nearly so in order to define a chamber (27) between the two legs of the return bend as viewed edgewise, said two legs being further bent into two L-shaped sections as viewed edgewise, the sections of the longer legs of both L's (23, 25) (FIGS. 3-6) being spaced from one another defining an anolyte circulation chamber (27) between them and serving as the principal electrolytic working faces of the anode element, the sections of the shorter legs (21, 28) of the two L's being oriented in the same direction and parallel to one another, and being in flat planar surface contact with one another at a location external to the anolyte circulation chamber (27) so that the anode element (13) is capable of being physically affixed to a substantially flat planar backplate (16) which is oriented substantially vertically upright in an electrolysis cell employing a multiplicity of anode elements attached to said anode backplate and interleaved between spaced cathode elements, and at least the working face sections of said single metal piece anode element being sufficiently foraminous to allow the easy circulation therethrough of anolyte liquid and gases.

4. A novel anode assembly for use in an electrolytic cell wherein aqueous solutions of alkali metal halides are electrolyzed and wherein a plurality of spaced, parallel anode elements are interleaved between a plurality of spaced, parallel cathode elements, said anode assembly being comprised of:

a plurality of anode elements electrically connected to and physically affixed to a vertically oriented anode backplate (16) (FIGS. 3, 5 and 6), with at least one of said anode elements (13) being:

a single, vertical sheet of foraminous metal which has two substantially right angle bends (22, 26) in it and is so bent to form four vertical planar sections (21, 23, 25, 28), and one vertical curved section (24), the top and bottom sides of all five of these sections coinciding with the top and bottom sides of said metal sheet and all five sections being oriented in a substantially vertical position;

the first (21) of said planar sections being parallel to, in surface contact with, and fixedly attached to said anode backplate (16), the first side end of said first planar section being the same as one side end of the single sheet, the second side end of said first planar section (21) being defined where the sheet has its first right angle bend (22);

said first right angle bend (22) also defining the first end of the second (23) of said planar sections with said right angle bend (22) being such that said second planar section (23) extends perpendicularly away from said anode backplate (16) into said cell, said second planar section (23) and said first planar section (21) thereby being L-shaped as viewed from above, the second end of said second planar section (23) being defined by the beginning of the curved section (24) of said sheet;

said curved section (24) being bent in the direction away from said second planar section (23) so as to locate said curved section (24) on the same side of said second planar section (23) as is said first planar section (21);

said curved section (24) being substantially an 180° bend as measured from said second planar section (23) to the end of said curved section (24), the end of said curved section (24) being the first end of the third (25) of said planar sections, said curved section (24) and said second (23) and third (25) planar sections thus having an elongated U-shape as viewed from above, said curved section (24) being curved in the direction such that the third planar section (25) extends back toward said anode backplate (16) parallel to but spaced apart from said second planar section (23) so as to define an anolyte circulation chamber (27) thereinbetween said first (21), second (23) and third (25) planar sections and said curved section (24);

said third planar section (25) extending far enough back from said curved section (24) toward said first planar section (21) to contact it and form its terminating end at the second right angle bend (26) formed thereat in the single metal sheet between the third (25) and fourth (28) planar sections;

said second right angle bend (26) also defining the first end of said fourth planar section (28) of said single sheet, said second right angle (26) being such that said fourth planar section (28) leaves said third planar section (25) in a direction along the anode backplate (16) toward the first side end of said first planar section (21);

said third (25) and fourth (28) planar sections thereby forming a second L-shape as viewed from above;

said first (21) and fourth (28) planar sections extending far enough along the anode backplate (16) from the second (23) and third (25) planar sections to allow the anode element (13) to be mechanically affixed and electrically connected to the anode backplate (16) at sites (30) on the first (21) and fourth (28) planar sections which are external to the anolyte circulation chamber (27);

said fourth planar section (28) being parallel to and in surface contact with said first planar section (21) in a manner so that said first planar section (21) is sandwiched between said fourth planar section (28) and said anode backplate (16).

5. The anode element of claim 4 wherein the anode element is attached by welds (47) to the anode backplate at sites (30) on the first (21) and fourth (28) planar sections which are external to the anode assembly's anolyte circulation chamber.

6. The anode element of claim 4 wherein the anode element is bolted to the anode backplate at sites on the first and fourth planar sections which are external to the anode assembly's anolyte circulation chamber.

7. The anode element of claim 4 wherein the single metal sheet is made of flattened expanded titanium metal wire mesh which is coated with a ruthenium oxide catalytic coating.

8. The anode element of claim 4 which further comprises at least one spacer (29) welded between the second (23) and third (25) planar sections to assure that these planar sections remain rigidly parallel to and spaced a uniform distance from each other.

9. The anode element of claim 4 wherein the foraminous metal sheet has a catalytic coating deposited at least on parts of one of the two faces of each of the said second and fourth planar sections.

10. The anode element of claim 4 wherein the anode element (13) has a porous diaphragm (17) disposed between it and each cathode surface (14) adjacent to it.

11. The anode element of claim 10 wherein the porous diaphragm is asbestos.

12. The anode element of claim 4 wherein the anode has an ion exchange membrane disposed between it and each cathode surface adjacent to it.

* * * * *

UNITED STATES PATENT AND TRADEMARK OFFICE
CERTIFICATE OF CORRECTION

PATENT NO. : 4,448,663

DATED : May 15, 1984

INVENTOR(S) : Hiep D. Dang, et al.

It is certified that error appears in the above-identified patent and that said Letters Patent is hereby corrected as shown below:

The sheet of Drawing consisting of Figures 1 and 2 should be deleted to appear as per the attached sheet.
Column 14, line 13, " "138 " should be --"1"--.

Column 14, Table I, under heading Single L** "cents" should be --cells--.

Column 14, Table I, under heading Single L**, the seventh number in the column, "0 023" should be --0.023--.

Column 16, line 50, "portion" should be --portions--.

Signed and Sealed this

Fifth Day of March 1985

[SEAL]

Attest:

DONALD J. QUIGG

Attesting Officer    Acting Commissioner of Patents and Trademarks